United States Patent
Roelse

(10) Patent No.: US 9,928,350 B2
(45) Date of Patent: Mar. 27, 2018

(54) DIGITAL RIGHTS MANAGEMENT

(75) Inventor: Peter Roelse, Hoofddorp (NL)

(73) Assignee: IRDETO B.V., Hoofddorp (NL)

( * ) Notice: Subject to any disclaimer, the term of this patent is extended or adjusted under 35 U.S.C. 154(b) by 0 days.

(21) Appl. No.: 14/379,278

(22) PCT Filed: Feb. 17, 2012

(86) PCT No.: PCT/EP2012/052816
§ 371 (c)(1),
(2), (4) Date: Aug. 15, 2014

(87) PCT Pub. No.: WO2013/120538
PCT Pub. Date: Aug. 22, 2013

(65) Prior Publication Data
US 2015/0026452 A1   Jan. 22, 2015

(51) Int. Cl.
*H04L 29/06* (2006.01)
*G06F 21/10* (2013.01)
(Continued)

(52) U.S. Cl.
CPC ............ *G06F 21/10* (2013.01); *H04L 9/0822* (2013.01); *H04L 9/14* (2013.01); *H04L 63/0428* (2013.01);
(Continued)

(58) Field of Classification Search
CPC ..... H04L 9/14; H04L 9/0822; H04L 63/0428; H04L 2463/062; H04L 2463/101;
(Continued)

(56) References Cited

U.S. PATENT DOCUMENTS 7,107,448 B1 * 9/2006 MacKay ............... H04L 63/062
                                                   713/171
9,147,050 B2 * 9/2015 Park ....................... G06F 21/10
(Continued)

FOREIGN PATENT DOCUMENTS

| CN | 101442670 A | 5/2009 |
| EP | 1253739 A1 | 10/2002 |
| EP | 2461564 A1 | 6/2012 |

OTHER PUBLICATIONS

System Specification Version 1.0, Digital Entertainment Content Ecosystem (DECE) LLC, Jun. 1, 2011.
(Continued)

*Primary Examiner* — Thu Ha Nguyen
(74) *Attorney, Agent, or Firm* — Rimon PC; Marc Kaufman

(57) ABSTRACT

There is disclosed a method of controlling use of encrypted content by a plurality of client terminals each provided with a digital rights management (DRM) client and a content decryption module separate to the DRM client. First key information is provided for use by one or more selected ones of the DRM clients, and second key information is provided for use by one or more selected ones of the content decryption modules. Content key information is encrypted to form encrypted content key information such that the selected ones of the content decryption modules are enabled by the second key information to recover the content key information from the encrypted content key information. The encrypted content key information is further encrypted to form super-encrypted content key information such that the selected ones of the DRM clients are enabled by the first key information to recover the encrypted content key informa-
(Continued)

tion from the super-encrypted content key information. Corresponding head-end and client terminal apparatus are also disclosed.

30 Claims, 9 Drawing Sheets

(51) Int. Cl.
H04L 9/08 (2006.01)
H04L 9/14 (2006.01)
(52) U.S. Cl.
CPC .. G06F 2221/07 (2013.01); G06F 2221/0753 (2013.01); H04L 2209/603 (2013.01); H04L 2463/062 (2013.01); H04L 2463/101 (2013.01)
(58) Field of Classification Search
CPC ............... G06F 21/10; G06F 2221/07; G06F 2221/0753; G06F 2209/603
USPC ......... 713/150, 164, 171; 380/278, 201, 307
See application file for complete search history.

(56) References Cited

U.S. PATENT DOCUMENTS

| | | | | |
|---|---|---|---|---|
| 2003/0084306 A1* | 5/2003 | Abburi | ............ | G06F 21/10 713/188 |
| 2005/0091491 A1* | 4/2005 | Lee | ............ | G06F 21/10 713/167 |
| 2005/0097368 A1* | 5/2005 | Peinado | ............ | G06F 21/10 726/4 |
| 2005/0209972 A1* | 9/2005 | Bjorkengren | ....... | G06Q 20/382 705/57 |
| 2006/0277415 A1* | 12/2006 | Staring | ............ | G06F 21/10 713/193 |
| 2007/0098156 A1* | 5/2007 | Blythe | ............ | G06F 21/10 380/37 |
| 2007/0260548 A1 | 11/2007 | Farrugia | | |
| 2007/0265966 A1* | 11/2007 | Kahn | ............ | G06F 21/10 705/51 |
| 2007/0265978 A1* | 11/2007 | Kahn | ............ | G06Q 30/04 705/59 |
| 2007/0266414 A1* | 11/2007 | Kahn | ............ | H04N 7/162 725/113 |
| 2007/0294170 A1* | 12/2007 | Vantalon | ............ | G06F 21/10 705/50 |
| 2008/0021839 A1* | 1/2008 | Peinado | ............ | G06F 21/10 705/59 |
| 2008/0263621 A1* | 10/2008 | Austerlitz | ........ | H04N 21/43615 725/139 |
| 2008/0267399 A1* | 10/2008 | Medvinsky | ........... | H04L 9/0841 380/201 |
| 2009/0133103 A1* | 5/2009 | Sathyan | ............ | H04L 63/0428 726/4 |
| 2009/0177793 A1* | 7/2009 | Josa | ............ | H04L 63/10 709/231 |
| 2009/0208006 A1* | 8/2009 | Candelore | .......... | H04N 21/2347 380/200 |
| 2009/0208016 A1* | 8/2009 | Choi | ............ | G06Q 20/3829 380/277 |
| 2011/0302624 A1* | 12/2011 | Chen | ............ | G06Q 20/10 726/1 |
| 2012/0131606 A1* | 5/2012 | Lejeune | ............ | H04N 21/4627 725/31 |
| 2013/0054970 A1* | 2/2013 | Cheng | ............ | G06F 21/10 713/171 |
| 2013/0124866 A1* | 5/2013 | Farrugia | ............ | H04L 9/0822 713/171 |
| 2013/0156196 A1* | 6/2013 | Jogand-Coulomb | ... | G06F 21/10 380/278 |
| 2013/0159707 A1* | 6/2013 | Jogand-Coulomb | ... | G06F 21/10 713/164 |
| 2015/0026452 A1* | 1/2015 | Roelse | ............ | H04L 63/0428 713/150 |
| 2015/0074388 A1* | 3/2015 | Josa | ............ | H04L 63/0428 713/154 |
| 2015/0326563 A1* | 11/2015 | Chan | ............ | H04L 63/0823 713/172 |

OTHER PUBLICATIONS

International Search Report and Written Opinion for corresponding International Application No. PCT/EP2012/052816 dated Nov. 5, 2012.
Marc A. Kaplan, "IBM Cryptolopes,SuperDistribution and Digital Rights Management", Dec. 30, 1996.
Access, Terminals, Transmission and Multiplexing (ATTM); Integrated Broadband Cable and Television Networks; K-LAD Functional Specification, ETSI TS 103 162 V1.1.1 (Oct. 2010) Technical Specification.
"Advanced Encryption Standard (AES)", Nov. 26, 2001, Federal Information Processing Standards Publication 197.

* cited by examiner

DIGITAL RIGHTS MANAGEMENT

RELATED APPLICATION DATA

This application claims priority to International Patent Application No. PCT/EP2012/052816, filed Feb. 17, 2012, the disclosure of which is hereby incorporated by reference in its entirety.

FIELD OF THE INVENTION

The invention relates to digital rights management. In particular, the invention relates to the control of content at a plurality of client terminals using encryption of the content before delivery to the client terminals, and control of client key information delivered to the client terminals for use in decrypting the content.

BACKGROUND OF THE INVENTION

With the increasing availability of broadband Internet access and the increasing number of consumer devices provided with IP connectivity, the distribution of digital content (such as music and movies) has been moving from using physical content carriers like CDs, DVDs and Blu-ray discs to online distribution. Typically, in online content acquisition and distribution, a consumer purchases digital content online from a retailer. After purchasing content, the consumer can download the content from a download service provider (DSP) associated with the retailer. A device used by a consumer to access content acquired from the retailer is referred to as a client terminal in this document (a client terminal is also referred to as customer premises equipment in the literature). A personal computer, a mobile device and a pay-TV set-top box are examples of a client terminal.

A digital rights management (DRM) system can be used to control access to digital content and to enforce content usage rules. In a DRM system, content is encrypted before it is distributed to a consumer (that is, to a client terminal of the consumer) to control access to the content. If a consumer purchases content, then the DSP generates a DRM licence for that content and distributes the DRM licence to the client terminal of the consumer. The DRM licence contains a content key required to decrypt (or access) the content and a set of usage rules associated with the content. The DRM licence and the encrypted content are input to a DRM client at the client terminal. The DRM client verifies the usage rules contained in the DRM licence. If these usage rules are satisfied, then the DRM client provides access to the content, enabling the client terminal to render the content. A number of different types of DRM systems exist, each with their own content packaging method, content encryption method, DRM licence format and content usage rules.

DRM systems typically support the concept of DRM domains. A DRM domain consists of one or more DRM clients, and is associated with the client terminals that contain a DRM client of the DRM domain. A domain of client terminals associated with a DRM domain will also be referred to as a domain of client terminals in the following. For example, a domain of client terminals may comprise a number of client terminals owned by a particular consumer. After content is purchased from the retailer, the associated DSP generates a DRM licence for the content and the DRM domain. Next, the DSP distributes the content and the DRM licence to one of the client terminals in the DRM domain. The DRM licence enables all client terminals in the DRM domain to access the content. In other words, the consumer can copy the content and the DRM licence from one client terminal to another client terminal in the domain of client terminals, allowing the other client terminal to access (or render) the content without acquiring a new DRM licence (and without needing an online connection between the moment of copying the content and the DRM licence and the moment of rendering the content using the other client terminal). DRM systems typically support dynamic DRM domains in that a DRM client (and its associated client terminal) can join or leave a DRM domain. For example, a consumer may be allowed to select the client terminals in the domain of client terminals, as long as their total number does not exceed a pre-defined maximum number of client terminals. In general, a DRM client (and its associated client terminal) may be associated with more than one DRM domain.

Prior art DRM systems typically allow any DSP to service the DRM client at a client terminal (under the assumption that the DSP has an agreement with the associated DRM supplier). In other words, prior art DRM systems typically allow any DSP to manage the DRM domain or DRM domains associated with the DRM client (the DRM domains being defined independently by every DSP), to generate DRM licences, and to distribute content and DRM licences to the client terminal.

Before distributing content, the content is first packaged in a file format supported by the DRM system. Next, the packaged content is encrypted using an encryption method supported by the DRM system. FIG. 1 shows an example of a prior art DSP 10, including a content packaging module 12 and a content encryption module 14. In practice, the content may already be packaged and encrypted when it is delivered to the DSP, e.g., the content provider may have performed these operations.

The DSP 10 of FIG. 1 manages DRM clients using a DRM key management module 16. The DRM key management module generates key management messages. A key management message is used to distribute cryptographic keys (other than the key used to encrypt content which is distributed using a DRM licence, as detailed later) to the client terminal 20 which includes a DRM client 22. For example, a key management message can be used to allow the client terminal to join a DRM domain, as discussed later.

DRM licences are created by a DRM licence management module 18 at the DSP 10. A DRM licence allows a client terminal 20 to access the content associated with the DRM licence. The DRM licence is associated with either a particular DRM client, or with a particular DRM domain. As a DRM domain may consist of a single DRM client, the DRM key management and DRM licence management associated with a particular DRM client is similar to the DRM key management and DRM licence management associated with a particular DRM domain comprising one DRM client. For ease of exposition, the examples described in this document therefore assume without loss of generality that a DRM licence is associated with a DRM domain.

In the following, $E_i(K,M)$ denotes the encryption of a message M using encryption method $E_i$ and the encryption key K. The encryption method $E_i$ is defined by an encryption algorithm and a mode of operation for the encryption algorithm. The encryption methods $E_i$ of the schemes described in this document generally use a symmetric encryption algorithm. A symmetric encryption algorithm has the property that it is easy to derive the decryption key from the encryption key and the other way around. Without loss of generality, it is assumed that the encryption key is equal to the decryption key in all encryption methods $E_i$ considered in this document. For example, the well known Advanced Encryption Standard (AES) with a block size of 128 bits and a key size of 128 bits can be used as the encryption algorithm for all encryption methods $E_i$ considered in this document. Please refer to the NIST document "Specification for the advanced encryption standard (AES), Federal Information Processing Standards Publication 197, 2001" in this respect.

In practice, the electronic codebook (ECB) mode of operation is often used to encrypt and decrypt keys. The mode of operation used for encrypting and decrypting content depends on the type of DRM system; two popular modes for encrypting and decrypting content are the cipher-block chaining mode and the counter mode. Throughout this document, $D_i(K,C)$ denotes the decryption of a ciphertext C using decryption method $D_i$ and the key K, with the property that $D_i(K, E_i(K,M))=M$ for all messages M and for all keys K (and for all values of i considered in this document).

However, asymmetric encryption algorithms (also referred to as public key encryption schemes in the literature) can be used as well as or instead of symmetric schemes, if desired, by making suitable adjustments to the described embodiments where necessary in ways which will be familiar to the skilled person.

Content (e.g., a movie) protected by a DRM system is generally encrypted using a content key CK. To encrypt content, the DSP 10 may first generate a content key CK (e.g., an AES key). The DSP 10 encrypts the content using content encryption function $E_1$ and CK to produce the encrypted content $E_1(CK, Content)$. The DSP 10 stores the encrypted content in a database containing all content that can be distributed to a client terminal 20. In addition, the DSP 10 securely stores the content key CK.

If a client terminal 20 joins a DRM domain, then a DRM client key DCK may be distributed to the DRM client associated with or embedded in the client terminal, using a key management message generated by the DRM key management module 16. It is assumed here that DCK is a symmetric key, but instead a DCK can be the private key of an asymmetric key pair if a public key encryption scheme is used. This DCK is a shared key in that all client terminals in the DRM domain require access to this key to process DRM licences associated with the DRM domain. If the client terminal 20 is the first client terminal joining the DRM domain, then the DRM key management module 20 may first generate a DCK (e.g., using a pseudo-random number generator). Before distributing the DCK to a client terminal 20, the DRM key management module 16 typically protects the confidentiality and the authenticity of DCK using one or more higher-level DRM keys. For example, the DRM key management module 16 may encrypt DCK using a higher-level DRM key, and generate a message authentication code or a digital signature using another higher-level DRM key. The message authentication code or digital signature can be appended to the encrypted DCK, producing an initialisation message DCKinit. In general, DCKinit may be any message from which the DRM client associated with client terminal 20 is able to derive the key DCK. The DRM key management module 16 includes DCKinit in a key management message, and distributes this key management message to the client terminal 20.

In some cases the key DCK or the DCKinit message is pre-loaded in the DRM client (e.g., DCK or DCKinit may have been loaded in the DRM client before the DRM client was installed in the client terminal 20). If a DCK or a DCKinit message is pre-loaded in the DRM client, then no key management message containing DCKinit needs to be distributed to the client terminal 20. In addition, if a DCK is pre-loaded in the DRM client, then no corresponding DCKinit message needs to be generated.

After a consumer purchases content from a retailer, the associated DSP 10 generates a DRM licence associated with the content and DRM domain. To do this the DSP retrieves the content key CK that was used to encrypt the content and the DCK associated with the DRM domain from secure storage. The content key CK is then encrypted using the DCK and the encryption function $E_2$, producing the ciphertext $E_2(DCK,CK)$. This ciphertext is included in the DRM licence, which is distributed to a client terminal 20 associated with the DRM domain. The DRM licence may also include content usage rules.

Because the DSP has stored the content key CK, the DSP 10 can generate DRM licences containing the same content key CK for different DRM domains. Further, as the DCK associated with different DRM domains will be different, the encrypted content key will differ in these DRM licences, making a DRM licence specific for a DRM domain. In particular, if encrypted content is copied to one or more client terminals in another DRM domain (e.g., if encrypted content is shared between different DRM domains using a peer-to-peer network), then a new DRM licence can be generated for the other DRM domain and distributed to a client terminal in the other DRM domain, enabling the client terminals in the other DRM domain to render the copied content. In addition, if the DSP 10 pre-loads the encrypted content on client terminals (e.g., on client terminals associated with different DRM domains), then a DRM licence can be generated for a DRM domain and distributed to a client terminal in the DRM domain in order to enable the client terminals in the DRM domain to render the pre-loaded content. Such distribution methods are generally referred to as content super-distribution in the prior art.

FIG. 2 shows one way in which the content may be rendered at a prior art client terminal 20. The DRM client 22 first derives DCK from the initialisation message DCKinit, delivered in a key management message 31, at a derive DCK function 30. For example, the derive DCK function 30 may verify the authenticity of the initialisation message using a higher-level DRM key, and if the initialisation message is authentic, then the derive DCK function 30 may decrypt the initialisation message using a higher-level DRM key, producing DCK. Second, the encrypted content $E_1(CK, Content)$ and the DRM licence 32 are input to the DRM client. If the DRM licence contains content usage rules, then the DRM client 22 verifies these content usage rules. If the content usage rules are satisfied, then the DRM client decrypts the encrypted content key $E_2(DCK,CK)$ using decryption function $D_2$ and DCK, producing content key CK. Third, the DRM client 22 uses content decryption function $D_1$ and the content key CK to decrypt the encrypted content $E_1(CK, Content)$, producing the plaintext content 34, which can be rendered by the client terminal 20.

In practice, a prior art DSP 10 typically uses a DCK for generating multiple DRM licences 32 (associated with multiple pieces of content for the DRM domain). This implies that a DRM client 22 in the DRM domain uses DCK for accessing multiple pieces of encrypted content. If DCK is re-used, then the key management message 31 containing the corresponding DCKinit message does not need to be distributed with every DRM licence (recall that no key management message containing DCKinit needs to be distributed to the client terminal 20 if the key DCK or the DCKinit message was pre-loaded in the DRM client).

If a client terminal leaves a DRM domain, then the client terminal 20 may delete its stored DCKinit messages and DCKs associated with the DRM domain and the DSP (e.g., its DRM key management module 16) may generate a new DCK and distribute this new DCK to the other client terminals in the DRM domain using new DCKinit messages and new key management messages. In general, the DSP and/or the client terminal may take any action that prevents the client terminal that leaves the DRM domain from further processing DRM licences associated with the DRM domain.

The prior art DRM client 22 illustrated in FIG. 2 may be implemented in software executed on an integrated circuit in the client terminal. Alternatively, the prior art DRM client 22 may be implemented inside a detachable hardware module. Software and/or hardware protection techniques may be used to make the DRM client tamper-resistant and read-proof (e.g., to prevent an adversary from compromising secret keys or modifying content usage rules). In addition, a measure may be implemented to bind/lock the DRM client 22 to the client terminal 20. Such a measure can prevent an adversary from using the DRM client 22 to illegally render the plaintext content 34 on another client terminal (that is, to render the plaintext content 34 on a client terminal outside the DRM domain).

For performance reasons, the content decryption algorithm or method is often implemented in a hardware decryption module (also referred to as a hardware accelerator in the prior art literature). Such an implementation is shown in FIG. 3 in which the DRM client 22 outputs the content key CK. The content key CK and the encrypted content $E_1$(CK, Content) are provided as input to a content decryption module 36. The content decryption module decrypts the encrypted content $E_1$(CK, Content) using content decryption function $D_1$ and the content key CK, producing the plaintext content 34, which can be rendered by the client terminal 20 or a content rendering device connected to the client terminal 20 (for instance, the client terminal may be a pay-TV set-top box connected to a television).

In the example depicted in FIG. 3, it is assumed that the content decryption module 36 is implemented in an integrated circuit of the client terminal 20. The DRM client 22 may be implemented in the same integrated circuit. Alternatively, the DRM client 22 may be implemented in a separate integrated circuit of the client terminal 20, or the DRM client 22 may be implemented in a detachable hardware module.

Software and/or hardware protection techniques may be used to make the DRM client 22 and/or the content decryption module 36 tamper-resistant and read-proof (e.g., to prevent an adversary from compromising secret keys or modifying content usage rules). Further, a measure may be implemented to secure the distribution of CK from the DRM client 22 to the content decryption module 36. For instance, the DRM client 22 may encrypt the content key CK using a higher-level key shared between the DRM client and the content decryption module 36, and pass the encrypted content key to the content decryption module (instead of passing the plaintext content key CK to the content decryption module). Next, the content decryption module 36 can decrypt the encrypted content key received from the DRM client 22 using the shared higher-level key, producing the plaintext content key CK.

In addition, a measure may be implemented to bind/lock the DRM client 22 to the client terminal 20. Such a measure can prevent an adversary from using the DRM client 22 to illegally render the plaintext content 34 on another client terminal (that is, to render the plaintext content 34 on a client terminal outside the DRM domain). For example, the DRM client 22 may encrypt CK in such a way that the resulting ciphertext can only be decrypted correctly by the content decryption module 36 of the client terminal 22 (e.g., by making the shared higher-level key used to encrypt and decrypt CK unique to that combination of DRM client and content decryption module).

The implementation of a DRM client 22 (and the implementation of the content decryption algorithm or method if a hardware accelerator is used) usually has/have to comply with a set of DRM compliance and robustness rules as defined by the DRM supplier. For example, the DRM supplier may require that a unique number is loaded into a client terminal 20 during its manufacturing (also referred to as personalization of the client terminal). The unique number is typically used to bind/lock the DRM client 22 to the client terminal 20. For example, the DRM client 22 may implement a routine to verify the value of this unique number and only provide its functionality if the value of this number is as expected.

Frequently in the prior art, a DRM client 22 can be distributed to a client terminal 20 during its operational phase (e.g., by distributing a new detachable hardware module containing the DRM client 22 to the client terminal, or by downloading a new software image containing the DRM client 22 at the client terminal). However, a client terminal 20 can only use a DRM client 22 if the client terminal satisfies the DRM compliance and robustness rules of the associated DRM supplier. For example, the DRM compliance and robustness rules may require that a client terminal is personalized for that type of DRM system during the manufacturing stage of the client terminal. In other words, a type of DRM client for which the client terminal does not satisfy the associated DRM compliance and robustness rules cannot be used on the client terminal.

In practice, a client terminal manufacturer may select a particular type of DRM system and produce client terminals that satisfy the DRM compliance and robustness rules for that type of DRM system only, and different client terminal manufacturers may thereby selected different types of DRM systems for their client terminals. As a result, a DSP may not have influence on the type of DRM system embedded in the client terminals it wants to service. This implies that the DSP may need to implement multiple DRM systems to service its population of client terminals.

The use of multiple DRM systems in a population of client terminals may have a number of drawbacks, for example:

1. the content packaging method and/or the content encryption method may be specific to the type of DRM system. This may mean that a DSP needs to store multiple copies of the encrypted content (e.g., one copy for each type of DRM system). Moreover, it may be that no content distribution is possible between devices implementing a different type of DRM client;

2. DRM licences are typically DRM system specific. This implies that two client terminals implementing a different type of DRM client cannot be in the same DRM domain. For example, if a consumer owns two client terminals that include a DRM client associated with two different types of DRM systems, then two DRM licences are required to be able to render acquired content on both client terminals, instead of one DRM licence if the client terminals would have been in the same DRM domain;

3. the DSP needs to have an agreement with all of the associated DRM system suppliers, and the DSP needs to implement each of these DRM systems (content packaging, content encryption, DRM key management and DRM licence management). This may increase the costs for a DSP or the associated retailer;

4. the level of system security is defined by the type of DRM system that offers the lowest level of security.

Points 1-4 as listed above can be addressed if a DSP can select and implement one type of DRM system, and distribute the DRM client of that type of DRM system to each client terminal it services. This can be achieved using hardware distribution (e.g., by distributing a detachable hardware module containing the DRM client) as well as or instead of software distribution (e.g., by downloading a new software image containing the DRM client). Such a distribution mechanism can also be used to upgrade a DRM client, for example to increase the level of security or to extend the functionality of the DRM system. In addition, the distribution mechanism enables a DSP to replace the DRM system it uses with a different type of DRM system, distributing the DRM client of the new type of DRM system to each client terminal it services. For instance, this may be desirable when the other type of DRM system offers a higher level of security. A DRM scheme with these properties may be referred to as swappable DRM, and for swappable DRM systems, a method for locking/binding a DRM client to a client terminal (or to multiple client terminals associated with a DRM domain) that is supported by a number of DRM systems (also referred to as compliant DRM systems) is needed.

As an example, a challenge-response mechanism between the DRM client and the client terminal can be defined. A client terminal implements this mechanism, enabling the client terminal to receive a challenge and to generate a response to the challenge that is unique to that client terminal. A DRM client of a compliant DRM system also implements the mechanism, enabling the DRM client to bind/lock itself to the client terminal by sending a challenge to the client terminal and by only providing its functionality if the response received from the client terminal is as expected. Alternatively, for the architecture shown in FIG. 3, the locking/binding mechanism may based on an encryption of the content key CK by the DRM client using a higher-level key shared between the DRM client and the content decryption module. If the shared higher-level key is unique to that combination of the DRM client and the content decryption module, then only that content decryption module is able to derive CK correctly from the output of the DRM client. Observe that these examples require that a security measure is implemented in the DRM client to bind/lock the DRM client to the client terminal.

It would be desirable to provide DRM control of encrypted content at client terminals which has a smaller impact on the architecture of existing DRM systems, such that little effort is required for an existing DRM system to become a compliant DRM system.

SUMMARY OF THE INVENTION

In arrangements according to the invention, the DRM client is provided as an element which is separate to the content decryption module of a client terminal (as in the prior art example shown in FIG. 3). In practice, this separation may be by virtue of different and separate hardware or integrated circuit elements, although it may also be by separation of functionality or circuitry on one or more integrated circuits and/or software programs and structures used by both the DRM client and the content decryption module. Further, the content decryption module may be personalized with a unique secret key referred to as the master key of the content decryption module. For instance, this master key can be a symmetric key or it can be the private key of an asymmetric key pair. The master key is used as a root key of a mechanism implemented in the content decryption module, the mechanism enabling the content decryption module to receive and decrypt an encrypted content key CK or, more generally, to receive and decrypt encrypted content key information CKI used by the content decryption module in the client terminal to derive a content key CK. An example of such a mechanism is described in ETSI TS 103 162 v1.1.1 "Access, Terminals, Transmission and Multiplexing (ATTM): Integrated Broadband Cable and Television Networks: K-LAD Functional Specification".

In the scheme presented in this document, a DSP first encrypts a content key CK or content key information CKI using a content decryption module key CDMK, producing an encrypted CK or CKI. Next, the DSP super-encrypts the encrypted CK or CKI using a DRM client key DCK, producing a super-encrypted CK or CKI. The super-encrypted CK or CKI is included in a DRM licence and the DRM licence is distributed to the client terminal. After receiving the DRM licence, the DRM client in the client terminal decrypts the super-encrypted CK or CKI using DCK, producing the encrypted CK or CKI. The DRM client passes the encrypted CK or CKI to the content decryption module. The content decryption module uses the content decryption module key CDMK and the mechanism implemented in the content decryption module to receive and decrypt the encrypted CK or CKI, producing the plaintext CK or CKI.

The super-encryption scheme ensures that a plaintext CK or CKI is not available inside a DRM client, or at the interface between a DRM client and a content decryption module.

Although the content decryption module key CDMK or an initialisation pattern CDMKinit from which the content decryption module is able to derive CDMK may be pre-loaded in the content decryption module (for instance, CDMK may be the master key of the content decryption module), preferably, the content decryption module implements a mechanism that enables the content decryption module to receive and derive a content decryption module key CDMK (e.g., a CDMK generated by the DSP) during its operational phase. Such a mechanism enables the DSP to update a CDMK. For instance, a DSP may want to update a CDMK after it has been compromised. In addition, such a mechanism can be used to manage dynamic domains of content decryption modules, as detailed later. A domain of content decryption modules is also referred to as a CDM domain in the following. A CDM domain is used for maintaining the DRM domain functionality of the DRM system. In other words, the CDM domain enables a consumer to copy content and the corresponding DRM licence from one client terminal to another client terminal in the DRM domain, allowing the other client terminal to access (or render) the content without acquiring a new DRM licence (and without needing an online connection between the moment of copying the content and the DRM licence and the moment of rendering the content using the other client terminal). Typically a CDM domain is associated with a domain of client terminals defined by a DRM domain.

The new scheme may use key management messages to allow a content decryption module to join a CDM domain and/or to update a CDMK (e.g., to enforce a content decryption module to leave a CDM domain). The bandwidth overhead caused by these additional key management messages may be small.

The described super-encryption method locks/binds a DRM client in a DRM domain to the content decryption modules in a CDM domain. More precisely, the outer-encryption of the super-encrypted CK or CKI in the DRM licence locks/binds the DRM licence to DRM clients in a particular DRM domain in that only a DRM client in that DRM domain can correctly remove the outer-encryption. The inner-encryption of the super-encrypted CK or CKI in the DRM licence locks/binds a DRM licence to the content decryption modules in the CDM domain, in that only content decryption modules in that CDM domain can correctly remove the inner-encryption.

This locking/binding by super-encryption is then used by all DRM systems designed to use the scheme (referred to as compliant DRM systems). The locking/binding method is indirect in that a DRM licence containing the super-encrypted CK or CKI is locked to a DRM domain and the DRM licence is locked to a CDM domain. This implies that, unlike prior art solutions, the new method does not require the DRM client to implement a security measure to lock/bind the DRM client to a particular client terminal. Further, as discussed in more detail later, the new scheme can be transparent to a DRM licence generator and the DRM client of existing DRM systems. These properties imply that minor or no changes are required to existing DRM systems in order to comply with the new method.

Accordingly, the invention provides a method of controlling use of encrypted content by a plurality of client terminals each provided with a digital rights management (DRM) client and a content decryption module separate to the DRM client, the method comprising: providing first key information for use by one or more selected ones of the DRM clients; providing second key information for use by one or more selected ones of the content decryption modules; encrypting content key information to form encrypted content key information such that the selected ones of the content decryption modules are enabled by the second key information to recover the content key information from the encrypted content key information; encrypting the encrypted content key information to form super-encrypted content key information such that the selected ones of the DRM clients are enabled by the first key information to recover the encrypted content key information from the super-encrypted content key information; and forwarding the super-encrypted content key information to at least one of said client terminals which comprises both a selected DRM client and a selected content decryption module.

The method may also comprise forwarding encrypted content to the at least one of said client terminals, the content being encrypted such that a selected content decryption module of said at least one of said client terminals can decrypt the content using said content key information. The key information may for example be suitable keys for use in decryption processes or information from which the suitable keys for use in the decryption processes can be derived, and may be provided to the relevant client terminals using one or more suitable key management messages, or could be provided preinstalled at the relevant client terminals, or embedded in a software download to a client terminal or contained in an update to such software, or a mixture of the above. For example, the first key information could be a DRM client key DCK, and could be preinstalled in a DRM client. Alternatively, the first key information could be a DCKinit message from which the DRM client is able to derive the DCK. The DCKinit message could be provided to a DRM client in a first key management message or the DCKinit message could be provided pre-installed in the DRM client, or a mixture of the two. Similarly, the second key information could be a content decryption module key CDMK, and could be preinstalled in a client terminal. Alternatively, the second key information could be a CDMKinit message from which the content decryption module is able to derive the CDMK. The CDMKinit message could be provided to a client terminal in a second key management message, or the CDMKinit message could be provided pre-installed in the client terminal, or a mixture of the two.

Accordingly, the method may further comprise generating a first key management message containing said first key information for use by one or more selected ones of the DRM clients, and directing said first key management message to said at least one of said client terminals which comprises both a selected DRM client and a selected content decryption module for use in recovering the encrypted content key information from the super-encrypted content key information. The method may further comprise generating a second key management message containing said second key information for use by one or more selected ones of the content decryption modules, and directing said second key management message to said at least one of said client terminals which comprises both a selected DRM client and a selected content decryption module for use in recovering the content key information from the encrypted content key information.

The content key information may be, for example, a symmetric content key which was used to encrypt the content and can be used to decrypt the content, or it may be the private key of an asymmetric key pair which can be used to decrypt the content, or it may be another piece of information which can be used by a client terminal to derive a content key for decrypting the content.

The super-encrypted content key information may be delivered to one or more client terminals in a DRM licence forwarded to the at least one client terminal comprising both a selected DRM client and a selected content decryption module. Such a DRM licence may provide the at least one client terminal with at least one content usage rule further controlling use of said content at said at least one client terminal.

The one or more selected DRM clients may be in the same DRM domain as each other. The DRM clients in this DRM domain may then each receive, in a said first key management message, a DCKinit message enabling each said DRM client to derive the same DRM client key. Each said DRM client in the DRM domain may then be adapted to use the same DRM client key to recover encrypted content key information from super-encrypted content key information, which may be contained in a DRM licence intended for use in the said DRM domain.

The one or more selected content decryption modules may be in the same content decryption module domain as each other. The content decryption modules in this content decryption module domain may then each receive, in a said second key management message, a CDMKinit message enabling each said content decryption module to derive the same content decryption module key. Each said content decryption module in the content decryption module domain may then be adapted to use the same content decryption module key to recover content key information from encrypted content key information received from the DRM client associated with the content decryption module, which may be contained in a DRM licence intended for use in the said content decryption module domain.

At least one of said client terminals may comprise one but not both of a selected DRM client and a selected content decryption module, so that such a client terminal is not enabled to recover said content key information from said super-encrypted content key information.

The content key information may comprise a key for decrypting said encrypted content. Alternatively, the content key information may enable the one or more selected content decryption modules to recover a content key for decrypting said encrypted content.

The encrypted content key information may be the same size, or alternatively smaller, than the content key, so that the encrypted content key information can appear to be no different to the content key to a DRM licence generator, and so that the super-encrypted content key information can appear to be no different to the encrypted content key to a DRM client handling the super-encrypted content key information.

A new (including an updated) DRM client may be installed in one or more of the client terminals, for example by sending new DRM software, control data, or updates to existing software or control data, from a server such as a DSP server to each client terminal to be updated. New key management messages and/or super-encrypted content key information can then be delivered to the client terminals to enable these updated client terminals to enable continued access to encrypted content stored at these terminals, or to enable access to new encrypted content subsequently delivered to these terminals.

The invention also provides a corresponding method of operating a client terminal comprising: providing first key information at a DRM client associated with the client terminal; providing second key information at the client terminal; receiving super-encrypted content key information; passing to the DRM client the super-encrypted content key information and receiving back from the DRM client encrypted content key information derived from the super-encrypted content key information using the first key information; and decrypting the encrypted content key information using the second key information to yield the content key information.

As mentioned above, the first key information may comprise a DRM client key DCK or a DCKinit message from which the DRM client is able to derive DCK. The DCK or the DCKinit message could be preinstalled in a DRM client or the DCKinit message could be provided to a DRM client in a first key management message. The second key information may comprise a content decryption module key CDMK or a CDMKinit message from which the content decryption module is able to derive the CDMK. The CDMK or the CDMKinit message could be preinstalled in a client terminal or the CDMKinit message could be provided to a client terminal in a second key management message. The method may therefore include receiving and passing to a DRM client associated with the client terminal a first key management message, the first key management message comprising said first key information and enabling said DRM client to derive a DRM client key which is then used by the DRM client to derive the encrypted content key information from the super-encrypted content key information. Similarly, the method may include receiving a second key management message comprising said second key information and deriving from this, at the client terminal, a content decryption module key which is then used to derive the content key information from the encrypted content key information.

The DRM client may be installed at the client terminal.

The method may also comprise receiving and decrypting encrypted content using the derived content key information.

The steps of deriving a content decryption module key, decrypting the encrypted content key information, and decrypting the encrypted content are carried out in a content decryption module separate from the DRM client.

The method may further comprise, at the DRM client, using the first key management message to derive the DRM client key, receiving the super-encrypted content key information, using the DRM client key to decrypt the super-encrypted content key information to form encrypted content key information, and returning the encrypted content key information for further decryption and use.

The method may further comprise receiving and installing a new DRM client at the client terminal, and may further comprise receiving and passing to the new DRM client a new first key management message, and/or new first key information, and/or new super-encrypted content key information for example in the form of a new DRM license.

The invention also provides apparatus corresponding to and providing means and functions for implementing the above methods.

In particular, the invention provides apparatus such as a download service provider or DRM server, for controlling use of encrypted content by a plurality of client terminals each provided with a digital rights management (DRM) client and a content decryption module separate to the DRM client, comprising: a content key information encryption function arranged to form encrypted content key information; a content key information super-encryption function arranged to encrypt the encrypted content key information to form super-encrypted content key information. The apparatus may further include a DRM key management module arranged to generate a first key management message for enabling one or more selected ones of the DRM clients to recover the encrypted content key information from the super-encrypted content key information and to generate a second key management message for enabling one or more selected ones of the content decryption modules to recover the content key information from the encrypted content key information.

The apparatus may be further arranged to forward the first and second key management messages (if a DRM key management module is used), the encrypted content, and the super-encrypted content key information to at least one of said client terminals which comprises both a selected DRM client and a selected content decryption module, the content being encrypted such that the at least one content decryption module can decrypt the content using said content key information.

The invention also provides a client terminal adapted for use with a DRM client associated with the client terminal, and arranged to receive super-encrypted content key information and encrypted content, the client terminal being arranged to pass to the DRM client the super-encrypted content key information and to receive from the DRM client encrypted content key information derived from the super-encrypted content key information using a DRM client key, the client terminal having a content key information decryption function arranged to decrypt the encrypted content key information using a content decryption module key to yield the content key information, and a content decryption function arranged to decrypt the encrypted content using the content key information.

The client terminal may be further arranged further arranged to receive first and second key management messages, the client terminal being arranged to pass to the DRM client the first key management message, the first key management message enabling the DRM client to derive the DRM client key, the client terminal further comprising a content decryption module key derive function arranged to derive the content decryption module key from the second key management message.

The client terminal may comprise said DRM client.

The content decryption module key derive function, the content key information decryption function, and the content decryption function may be located in a content decryption module of the consumer equipment separate from the DRM client. The content decryption module may be provided, for example, as or as part of or comprised within a client terminal integrated circuit.

The invention also provides apparatus combining the download service provider or server and a plurality of client terminals each as set out above or elsewhere in this document.

The invention also provides software or computer program code, and such software or computer program code carried on one or more computer readable media, having functionality adapted to provide and/or arranged to put into effect one or more parts of the client terminals and download service provider or DRM server, and corresponding methods as described herein.

BRIEF DESCRIPTION OF THE DRAWINGS

Embodiments of the invention will now be described, by way of example only, with reference to the accompanying drawings of which.

DETAILED DESCRIPTION OF EMBODIMENTS OF THE INVENTION

Figure 4:
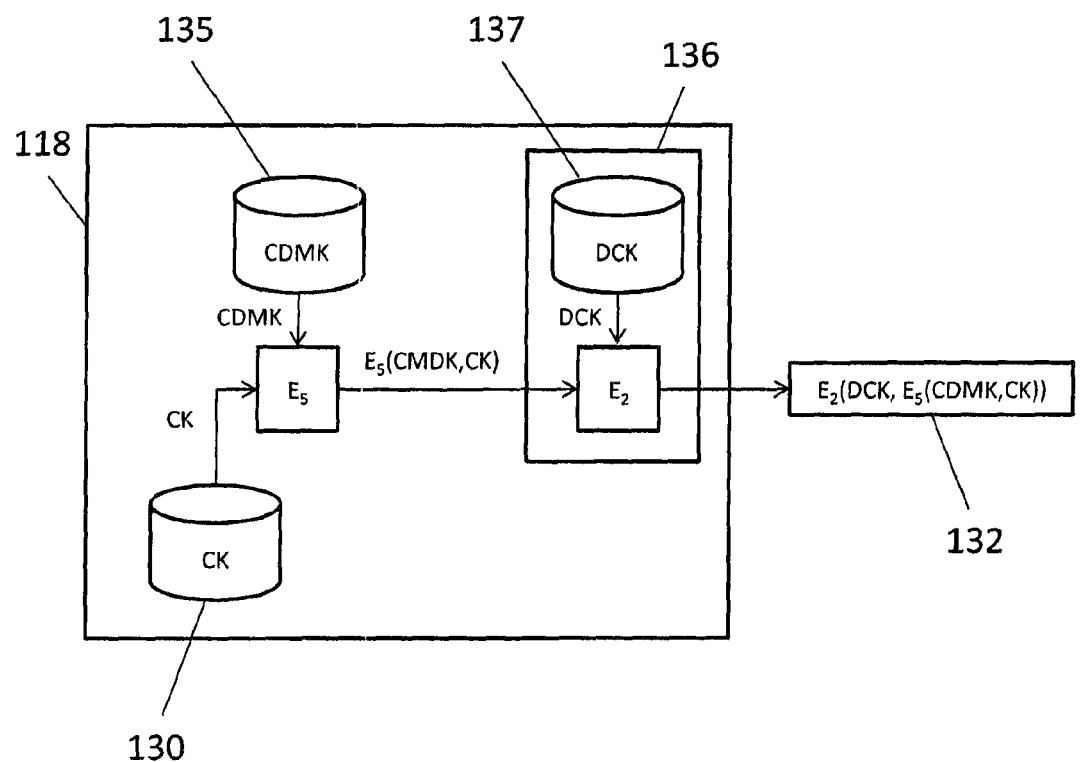
FIG. 4 illustrates a DRM licence management module according to embodiments of the invention.

FIG. 4 depicts the generation of a DRM licence 132, at a download service provider 110, according to the invention. The DRM licence is for use by one or more client terminals having both a DRM client and a content decryption module which are members of both a DRM domain and a CDM domain, as will be discussed in more detail later. In particular, the DRM licence generation may take place at a DRM licence management module 118 of the DSP 110.

A content key CK is held in secure CK storage 130 at the DSP 110. In generating the DRM licence 132 the content key CK is retrieved from the secure CK storage 130 and a content decryption module key CDMK is retrieved from secure CDMK storage 135. Next, CK is encrypted at a content key encryption function $E_5$ using CDMK to produce the ciphertext $E_5(CDMK,CK)$. This ciphertext is input to a DRM licence generator 136. The DRM licence generator 136 retrieves a DRM client key DCK from secure DCK storage 137, and super-encrypts the ciphertext $E_5(CDMK, CK)$ using super-encryption function $E_2$ and DCK, producing the ciphertext $E_2(DCK, E_5(CDMK,CK))$.

If an encryption scheme without message expansion is used, then encryption of the content key by the content key encryption function (rather than simply passing the content key directly) is transparent to the DRM licence generator 136. For example, this is the case if CK is a 128-bit AES key and if the content key encryption function uses AES in ECB mode.

The ciphertext $E_2(DCK, E_5(CDMK,CK))$ is included in the DRM licence 132, and the DRM licence 132 is distributed to one or more client terminals in the DRM domain.

Figure 1:
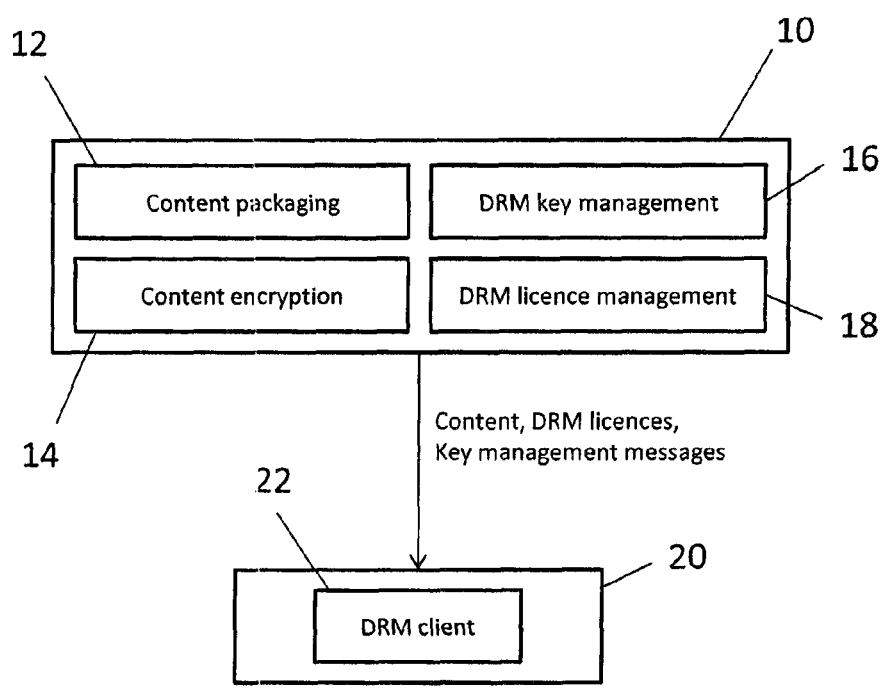
FIG. 1 illustrates a download service provider or DRM server and associated DRM client as may be used in the prior art.
Figure 2:
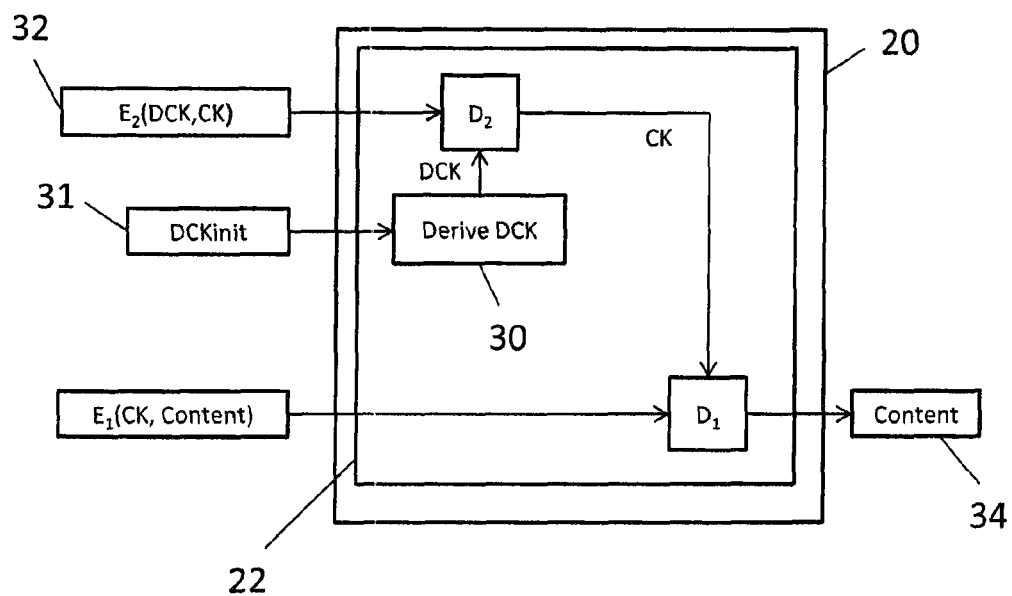
FIG. 2 shows an arrangement for recovering and using a content key CK in the DRM client of FIG. 1.
Figure 3:
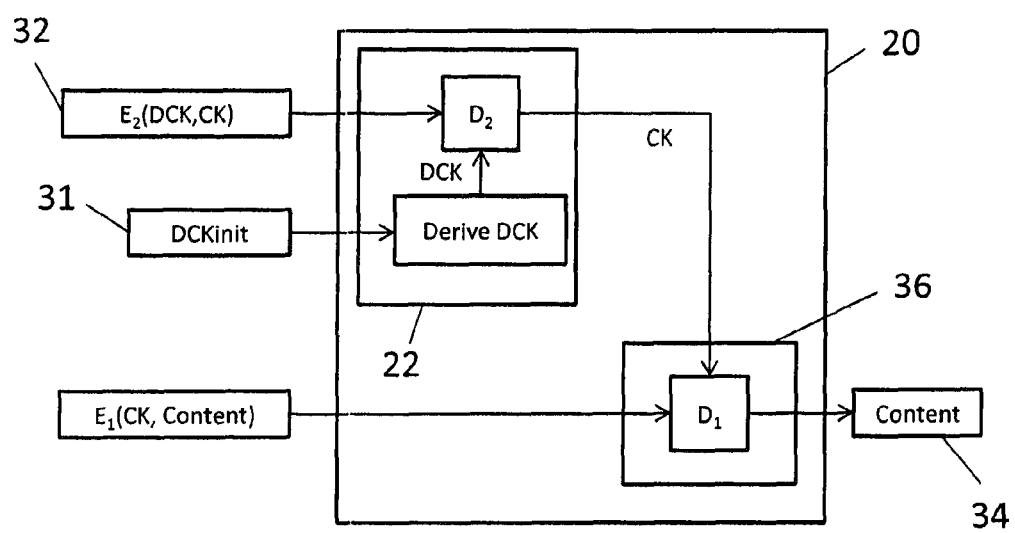
FIG. 3 shows an alternative arrangement for recovering and using a content key CK in the DRM client of FIG. 1.

Observe that, compared to the prior art examples depicted in FIGS. 2 and 3, the scheme depicted in FIG. 4 uses an additional encryption function $E_5$ using the CDMK as the encryption key. This additional encryption binds/locks the DRM licence to the CDM domain, in that only content decryption modules in the CDM domain can correctly remove this additional encryption, as detailed later. The encryption performed by the DRM licence generator 136 binds/locks the DRM licence to the DRM domain, in that only DRM clients in the DRM domain can correctly remove this encryption, as in the prior art examples.

Although in FIG. 4 a symmetric content key CK is used, the DRM licence 132 could more generally contain content key information CKI. In other words, CK in FIG. 4 could be replaced by content key information CKI, from which the content key CK can be derived by the content decryption module of an entitled client terminal, and the content key encryption function $E_5$ then becomes a content key information encryption function. For example, such content key information could be processed in the content decryption module of entitled client terminals using a cryptographic hash function. This cryptographic hash function may have one or more additional inputs, and the output of the cryptographic hash function includes the content key CK. In this way the hash function may be used to protect the authenticity of the one or more additional inputs, in that the content decryption module can only derive CK correctly if all inputs to the cryptographic hash function are authentic.

Figure 5:
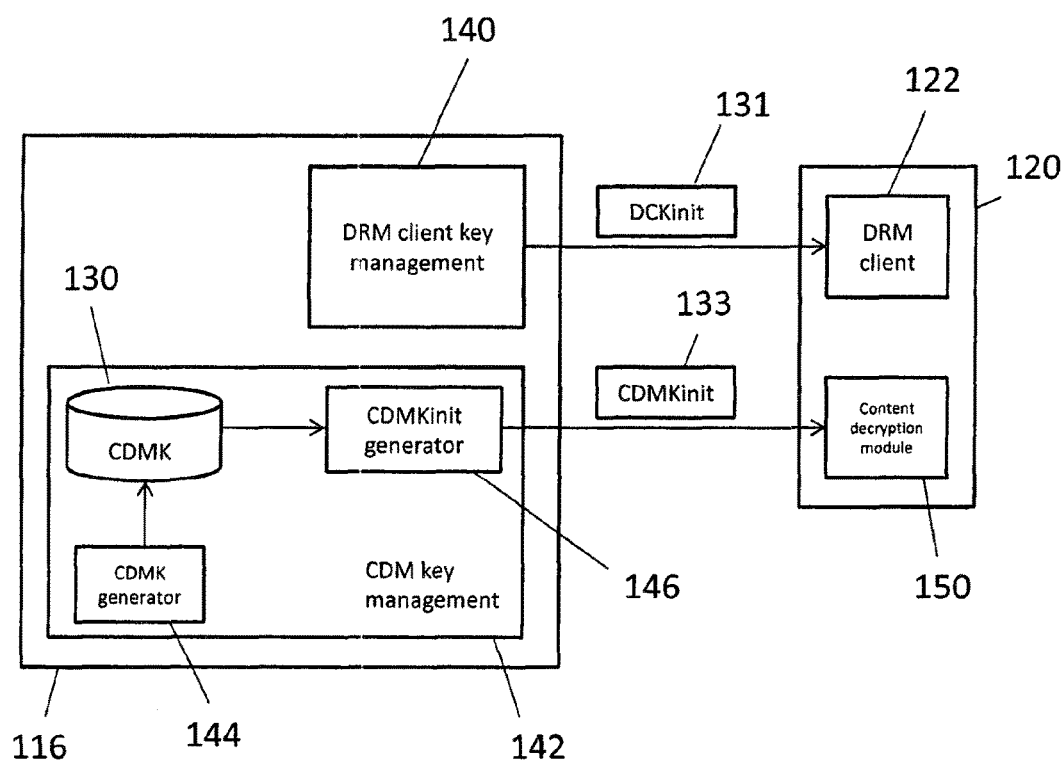
FIG. 5 illustrates a DRM key management module according to the invention for use with the DRM licence management module of FIG. 4.

DRM key management by a DRM key management module 116 at the DSP in order to implement the DRM licence generated according to FIG. 4 is depicted in FIG. 5.

If a DRM client 122 in a client terminal 120 joins a DRM domain, then a DRM client key DCK may be distributed to the DRM client 122 using a first key management message 131 generated by a DRM client key management module 140 at the DSP. It is assumed here that DCK is a symmetric key, but instead a DCK can be the private key of an asymmetric key pair if a public key encryption scheme is used. This DCK is a shared key in that all client terminals in the DRM domain require access to this key to process DRM licences associated with the DRM domain.

If the client terminal 120 is the first client terminal joining the DRM domain, then the DRM client key management module 140 may first generate a DCK (e.g., using a pseudo-random number generator).

Before distributing the DCK to a client terminal 120, the DRM client key management module 140 typically protects the confidentiality and the authenticity of DCK using one or more higher-level DRM keys. For example, the DRM client key management module 140 may encrypt DCK using a higher-level DRM key, and generate a message authentication code or a digital signature using another higher-level DRM key. The message authentication code or digital signature can be appended to the encrypted DCK, producing the DCKinit message contained in the first key management message 131. In general, DCKinit may be any message from which the DRM client associated with client terminal 120 is able to derive the key DCK. The first key management message 131 is distributed to the client terminal 120 (or, more precisely, to the DRM client 122 in the client terminal).

In some cases the key DCK or the DCKinit message is pre-loaded in the DRM client 122 (e.g., DCK or DCKinit may have been loaded in the DRM client before the DRM client was installed in the client terminal 120). If a DCK or a DCKinit message is pre-loaded in the DRM client, then no first key management message containing DCKinit needs to be distributed to the client terminal 120. In addition, if a DCK is pre-loaded in the DRM client 122, then no corresponding DCKinit message needs to be generated.

In addition to this, the DSP uses a CDM key management module 142 to enable the content decryption module 150 in the client terminal to join a CDM domain. First, the CDM key management module retrieves a content decryption module key CDMK associated with the CDM domain from secure CDMK storage 130. It is assumed here that CDMK is a symmetric key, but instead a CDMK can be the private key of an asymmetric key pair if a public key encryption scheme is used. The key CDMK is shared between all content decryption modules in the CDM domain.

If the client terminal 120 is the first device joining the CDM domain, then it may be necessary for the CDM key management module to generate a CDMK first, using CDMK generator 144. The generation of a CDMK may be performed by a pseudo-random number generator. The CDMK generator 144 is also used if a CDMK is updated, as detailed later.

The CDMK is input to a CDMKinit generator 146, which generates a CDMKinit message intended for the content decryption module 150 in the client terminal. For instance, the CDMKinit generator 146 may protect the confidentiality of CDMK using a higher-level content decryption module key and it may protect the authenticity of CDMK using a higher-level content decryption module key. In general, CDMKinit may be any message from which the content decryption module associated with client terminal 120 is able to derive the key CDMK. CDMKinit is included in a second key management message 133, which is distributed to the client terminal (or, more precisely, to the content decryption module of the client terminal). The content decryption module of the client terminal can use the CDMKinit message to derive CDMK, as discussed later.

In some cases the key CDMK or the CDMKinit message is pre-loaded in the content decryption module 150. For example, if the CDM domain comprises one content decryption module, then CDMK may be the master key of the content decryption module 150. If a CDMK or a CDMKinit message is pre-loaded in the DRM client, then no second key management message containing CDMKinit needs to be distributed to client terminal 120. In addition, if a CDMK is pre-loaded in the content decryption module, then no corresponding CDMKinit message needs to be generated.

Figure 6:
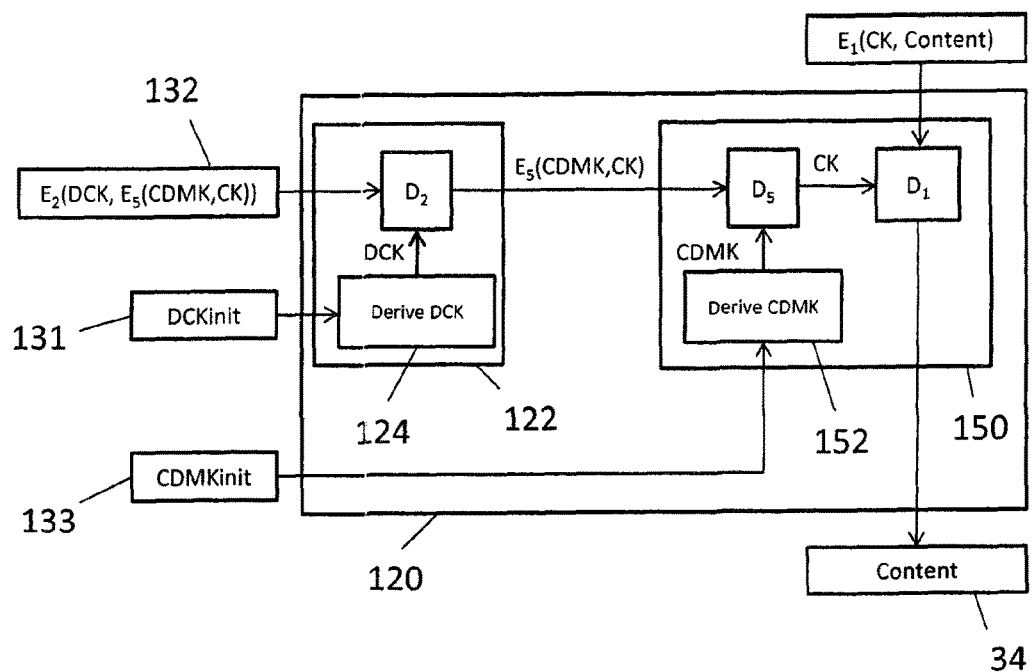
FIG. 6 shows a client terminal for receiving and processing key management messages and a DRM licence received from the DRM key management module and DRM licence management module of FIGS. 5 and 4.

FIG. 6 illustrates how the DRM licence 132 generated using the DRM licence management module 118 of FIG. 4, and the key management message messages 131,133 generated using the DRM key management module 116 of FIG. 5, are used when received at a client terminal 120. The client terminal also receives the encrypted content $E_1$(CK, Content). The client terminal may store the key management messages, the encrypted content and the associated DRM licence for future use. The first key management message 131 containing DCKinit is input to the DRM client 122. The DRM client 122 uses a DRM client key derive function 124 (shown as "Derive DCK" in FIG. 6) to derive DCK from the DCKinit message. For instance, this function may verify the authenticity of DCKinit using a higher-level DRM key and if DCKinit is authentic, then the function may decrypt DCKinit using a higher-level DRM key, producing DCK. The output of the DRM client key derive function 124 is the plaintext DCK.

In some cases the key DCK or the DCKinit message is pre-loaded in the DRM client 122. If a DCK or a DCKinit is pre-loaded in the DRM client 122, then no first key management message 131 containing DCKinit needs to be distributed to client terminal 120. In addition, if a DCK is pre-loaded in the DRM client 122, then no DRM client key derive function 124 is required.

The second key management message containing the CDMKinit message is input to the content decryption module 150. The content decryption module 150 uses a CDMK derive function 152 (shown as "Derive CDMK" in FIG. 6) to derive CDMK from CDMKinit. For instance, the content decryption module may verify the authenticity of CDMKinit using a higher-level content decryption module key and if CDMKinit is authentic, then the content decryption module may decrypt CDMKinit using a higher-level content decryption module key. In general, the CDMK derive function 152 may be any function that is able to derive CDMK from CDMKinit. The output of the CDMK derive function 152 is the plaintext CDMK.

The use of a second key management message containing a CDMKinit message allows the DSP to distribute a CDMK to a content decryption module (e.g., to enable a content decryption module to join a CDM domain or to update a CDMK, as described later). As a CDMK may typically be used for processing multiple DRM licences, the bandwidth overhead caused by these additional second key management messages can be negligible.

In some cases the key CDMK or the CDMKinit message is pre-loaded in the content decryption module 150. If a CDMK or a CDMKinit is pre-loaded in the content decryption module 150, then no second key management message 133 containing CDMKinit needs to be distributed to client terminal 120. In addition, if a CDMK is pre-loaded in the content decryption module, then no CDMK derive function 152 is required.

If the DRM licence 132 contains content usage rules, then the DRM client 122 verifies these usage rules. If the usage rules are satisfied, then the ciphertext $E_2$(DCK, $E_5$(CDMK, CK)) is decrypted using decryption function $D_2$ and DCK, producing the ciphertext $E_5$(CDMK,CK). As shown in FIG. 6, the DRM client 122 passes the ciphertext $E_5$(CDMK,CK) to the content decryption module 150. Notice that the DRM client 122 is similar to the DRM client 22 shown in the prior art example of FIG. 3. In particular, if the message $E_5$(CDMK,CK) has the same size as CK (in other words, if an encryption function $E_5$ without message expansion is used), then the super-encryption scheme of the invention may be transparent to the DRM client 122. Similar reasoning applies if content key information CKI enabling the content decryption module 150 to recover a content key for use in decrypting the content, rather than the content key itself, is included in the DRM licence 132, and if the size of $E_5$(CDMK,CKI) is not larger than the size of CK.

After the ciphertext $E_5$(CDMK,CK) is received by the content decryption module 150, the content decryption module uses content key decryption function $D_5$ and CDMK to compute CK. Finally, the encrypted content $E_1$(CK, Content) and CK are input to content decryption function $D_1$. The output of content decryption function $D_1$ is the plaintext content 34, which can be rendered by the client terminal 120. If content key information CKI is used in place of the content key itself in the DRM licence 132 then further functionality in the content decryption module 150 may be used to derive the content key CK from the content key information CKI for use by the content decryption function $D_1$.

Typically, CDMK and DCK are associated with the same domain of client terminals. In other words, the CDM domain comprises all content decryption modules of the client terminals associated with the DRM domain. This may be desirable for two reasons. First, if a CDM domain associated with CDMK contains one or more content decryption modules of client terminals that are outside the DRM domain associated with DCK, then the output $E_5$(CDMK,CK) of a DRM client in the DRM domain can be used to illegally render content associated with CK on the one or more content decryption modules of client terminals outside the DRM domain. Second, if a DRM domain contains one or more DRM clients that are associated with client terminals outside the CDM domain, then multiple DRM licences are required to render content on all client terminals in the DRM domain (that is, the DRM domain functionality is not maintained in this case).

In some cases CDMK and DCK are associated with different domains of client terminals. For example, this may be advantageous if a DSP replaces the DRM system with a different type of DRM system (also referred to as swapping the DRM system). Another example is if both client terminals which are compliant with the super-encrypted CK or CKI DRM licence of the invention, and non-compliant client terminals are in one DRM domain. These examples will be described in more detail later.

A CDMK may be updated. If a DSP wants to update a CDMK, then first a new CDMK is generated using the CDMK generator 114 (see FIG. 5). One or more new CDMKinit messages are generated for the content decryption modules in the CDM domain (typically one new CDMKinit message is generated for each content decryption module in the CDM domain), and each new CDMKinit message is included in a new second key management message. The new second key management messages are distributed to the client terminals in the CDM domain. After all client terminals in the CDM domain have received their new CDMKinit message, the DSP can use the new CDMK to generate new DRM licences. Notice that the client terminals in the CDM domain are forced to use the new CDMK when processing these new DRM licences; that is, the previous CDMK is revoked as soon as the DSP starts using the new CDMK. In general, a client terminal needs to identify which CDMKinit message is associated with a DRM licence to process the DRM licence. To address this, a CDMK identifier may be distributed together with each DRM licence 132 and with each CDMKinit message. Notice that the CDMKs and DCKs may typically have independent key lifecycles.

If a DRM client 122 in a client terminal 120 leaves a DRM domain, then the client terminal 120 may delete its stored DCKinit messages and DCKs associated with the DRM domain and the DSP (e.g., its DRM client key management module 140) may generate a new DCK and distribute this new DCK to the other client terminals in the DRM domain using new DCKinit messages and new first key management messages. In general, the DSP and/or the client terminal may take any action that prevents the client terminal that leaves the DRM domain from further processing DRM licences associated with the DRM domain.

If a content decryption module 150 in a client terminal 120 leaves a CDM domain, then the client terminal may delete its stored CDMKinit messages and CDMKs associated with the CDM domain and the DSP (e.g., its CDM key management module 142) may generate a new CDMK and distribute this new CDMK to the other client terminals in the CDM domain using new CDMKinit messages and new second key management messages. In general, the DSP or the client terminal may take any action that prevents the client terminal that leaves the CDM domain from further processing DRM licences associated with the CDM domain.

The super-encryption of the content key CK or content key information CKI offers an end-to-end protection of the CK or CKI (that is, a protection between the DSP and the content decryption module). In particular, a plaintext CK or CKI is never available in a DRM client. This end-to-end protection also means that the interface between the DRM client and the decryption module is protected.

The described methods and apparatus can be implemented in a manner which is transparent to the DRM licence generator 136 and the DRM client 122, implying that minor or no changes are required to existing DRM systems in order to implement the new methods and apparatus.

Figure 7:
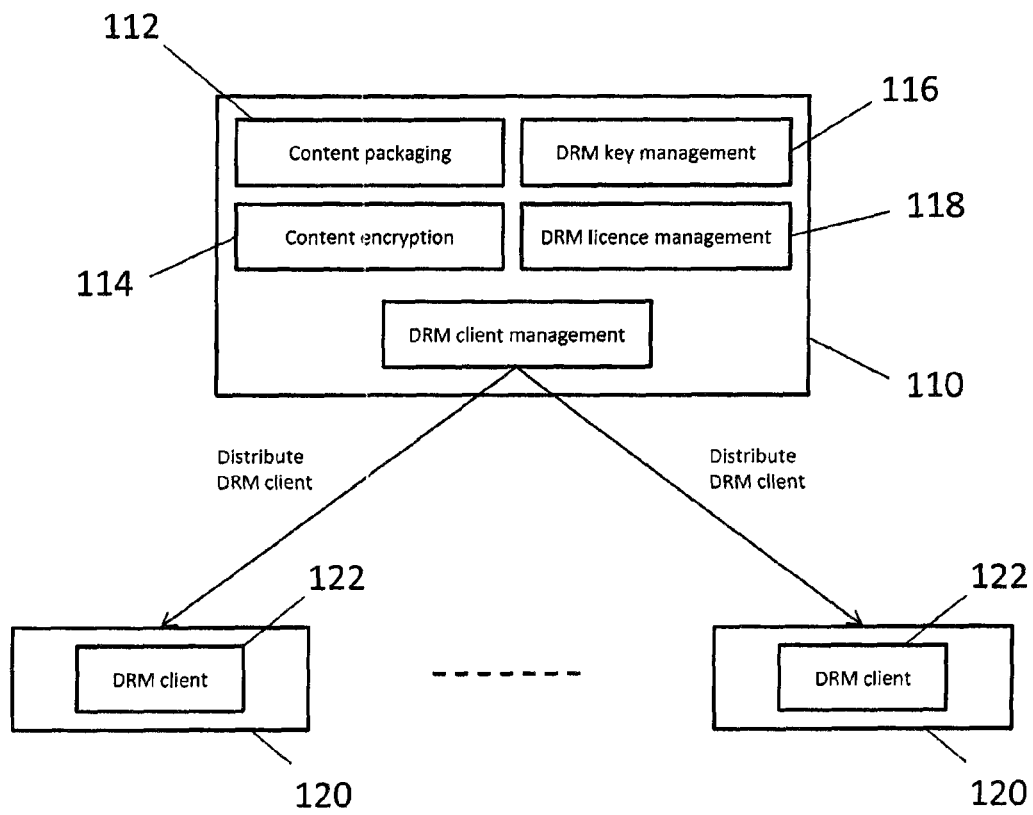
FIG. 7 illustrates a download service provider or DRM server and associated DRM clients according to embodiments of the invention.

FIG. 7 illustrates a download service provider 110 implementing the generation and distribution of encrypted content, and DRM licences and DRM key management messages as discussed above in connection with FIGS. 4 and 5, and a plurality of client terminals as discussed above in connection with FIG. 6. The DSP 110 includes a content packaging module 112 and a content encryption module 114. In practice, the content may already be packaged and/or encrypted when it is delivered to the DSP. The encrypted content to be delivered to the client terminals typically takes the form $E_1$(CK, Content) as discussed above.

The DSP 110 also includes a DRM key management module 116 and a DRM licence management module 118 as discussed above. The DRM key management module 116 generates the first and second key management messages illustrated in FIGS. 5 and 6, for distribution to one or more client terminals 120, and the DRM licence management module generates DRM licences 132 as illustrated in FIGS. 4 and 6, for distribution to one or more client terminals 120.

To use the described security architecture, the DSP 110 may first select a compliant DRM type or scheme (that is, a DRM type that is compliant with the content decryption module architecture) and then distribute a DRM client in the form of software or a software update, or as a detachable hardware module, to every client terminal that it wants to service. Alternatively, the DRM client may be pre-installed in a client terminal (e.g., during the manufacturing stage of the client terminal) or the DRM client may be distributed from a different source. The DRM client distribution mechanism may also be used to upgrade the DRM client (e.g., an upgrade may be used to increase the level of security or to offer more functionality) and/or the mechanism may be used to replace the DRM system with a different type of DRM system (also referred to as swapping the DRM system), as detailed later.

The DRM client 122 may be implemented in software and/or the DRM client 122 may be implemented in a detachable hardware module. Software protection techniques and/or hardware protection techniques may be used to make the DRM client 122 tamper-resistant and read-proof (e.g., to prevent an adversary from compromising secret keys or modifying content usage rules). However, the scheme described herein does not require that the DRM client 122 implements a security measure or mechanism to bind/lock the DRM client 122 to the client terminal 120. In other words, the DRM client does not need to be locked directly to the client terminal, because this functionality is provided by the DRM licence containing the super-encrypted CK or CKI as discussed above.

The DSP 110 of FIG. 7 typically uses a particular DCK and CDMK for creating multiple different DRM licences 132, so that the DCK and CDMK may be used for accessing multiple pieces of content. In such scenarios the corresponding first and second key management messages do not need to be distributed with every piece of encrypted content and associated DRM licence. In addition, if the key DCK or the DCKinit message was pre-loaded in the DRM client then no first key management message containing DCKinit is required. Similarly, if the key CDMK or the CDMKinit message was pre-loaded in the content decryption module, then no second key management message containing CDMKinit is required.

If a DSP 110 services both compliant client terminals (i.e. client terminals which are adapted to use the super-encrypted CK or CKI) and non-compliant client terminals with same type of DRM system, then the delivery of protected content keys and/or content key information associated with compliant client terminals and non-compliant client terminals differ. More particularly, the protected CK or CKI contained within DRM licences for compliant client terminals may be expressed as $E_2(DCK, E_5(CDMK,CK))$ or as $E_2(DCK, E_5(CDMK,CKI))$, but as $E_2(DCK,CK)$ or as $E_2(DCK,CKI)$ for non-compliant client terminals. The DSP 110 of FIG. 7 may manage this situation by generating different DRM licences for compliant client terminals and non-compliant client terminals respectively. If compliant client terminals and non-compliant client terminals are in the same DRM domain, then a drawback is that the consumer cannot use a DRM licence for compliant client terminals as input to non-compliant terminals (or the other way around) to render associated content. Instead, a new DRM licence needs to be acquired, and to this end the DSP 110 may automatically distribute two DRM licences to a client terminal in a DRM domain that contains both compliant and non-compliant client terminals. Alternatively, the DRM system may support the inclusion of two separate encrypted content keys or pieces of content key information (for example, the DRM system may include $E_2(DCK, E_5(CDMK,CK))$ and $E_2(DCK,CK)$ in one DRM licence). Notice that the CDM domain is smaller than the DRM domain in this scenario.

If the DSP 110 wants to upgrade the DRM client, then the DSP 110 distributes an upgrade DRM client in the form of software or a software update, or as a detachable hardware module, to every client terminal that it wants to service, shown in FIG. 7 as "Distribute DRM client" steps. After a client terminal installs the upgrade DRM client, the DRM client may access stored content that was distributed to a previously installed DRM client. A stored DRM licence associated with the stored content can be re-used as input to the upgrade DRM client if the associated DCK is available to the upgrade DRM client, and if the associated CDMK is available to the content decryption module. The associated DCK or a new corresponding DCKinit message may be pre-loaded in the upgrade DRM client or a new first key management message containing the new corresponding DCKinit may be issued to the upgrade DRM client to access DCK. Alternatively, a stored first key management message containing a stored DCKinit may be re-used by the upgrade DRM client to access DCK if the higher-level DRM key (or keys) required to process the stored DCKinit is/are available to the upgrade DRM client. The CDMK or the CDMKinit message associated with the DRM licence may be pre-loaded in the content decryption module or a stored second key management message containing CDMKinit may be re-used by the content decryption module to access CDMK. In other words, if the second key management message was stored, then the DSP does not need to generate and distribute a new second key management message.

If the DSP 110 issues a new DCK to an upgrade DRM client (e.g., by pre-loading a new DCK in the DRM client or by issuing a new first key management message containing the new DCKinit to the DRM client) and/or if the DSP 110 issues a new CDMK to the content decryption module (e.g., by issuing a new second key management message to the content decryption module), then new DRM licences for content already stored at the client terminal may be issued with the relevant CK or CKI being super-encrypted using the new DCK and/or the new CDMK.

Figure 8:
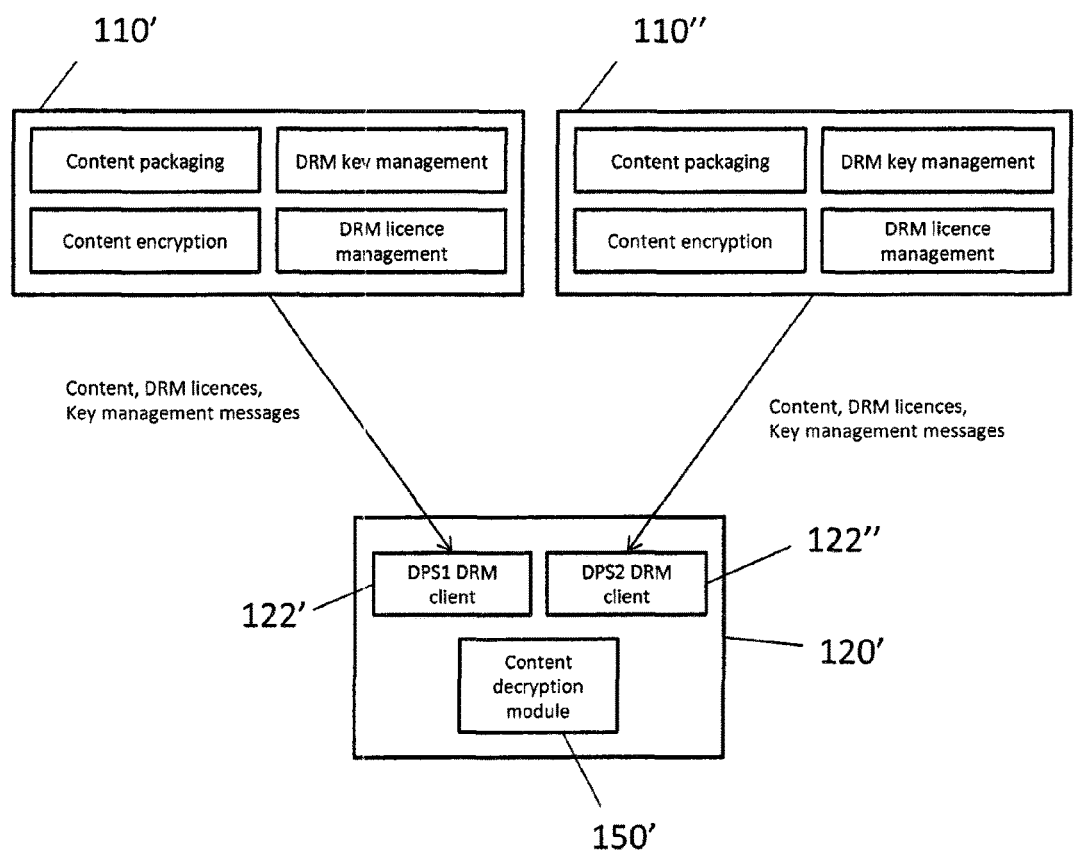
FIG. 8 illustrates the use of more than one download service provider or DRM server in servicing a client terminal.

FIG. 8 illustrates a situation in which two or more different DSPs 110' and 110" service a plurality of client terminals 120', with each DSP being enabled to use the content decryption module 150' of each client terminal, for example using the arrangements described in ETSI TS 103 162 v1.1.1 "Access, Terminals, Transmission and Multiplexing (ATTM): Integrated Broadband Cable and Television Networks: K-LAD Functional Specification". In FIG. 8 the first DSP 110' uses a first DRM client 122' in the client terminal, and the second DSP 110" uses a second DRM client 122" in the client terminal. Each DSP can operate the content decryption module 150' independently from the other by generating its own CDMKs and second key management messages. In this way the concurrent use of DRM clients is supported, with each DSP independently managing its own DRM and CDM domains. If the two DSPs use the same type of DRM system, then the DSPs 110', 110" may additionally share a DRM client 122 in a client terminal.

Figure 9:
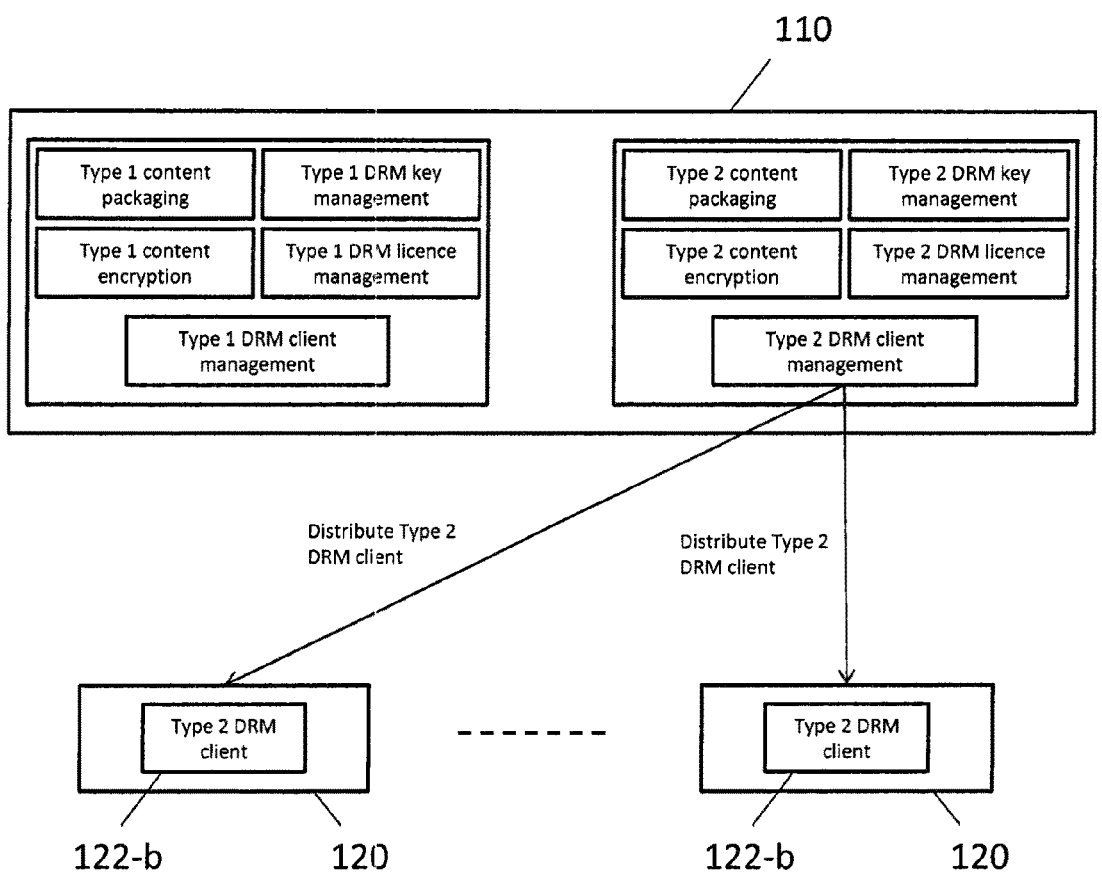
FIG. 9 shows how the DRM system may be swapped according to embodiments of the invention.

FIG. 9 illustrates how a DSP 110 and client terminals 120 may be operated in replacing an already implemented DRM system with a different type of DRM system (also referred to as swapping the DRM system). A possible reason for swapping the DRM system is that the new DRM system may be more cost effective than the current DRM system (e.g., the new DRM system may offer a higher level of security, reducing or eliminating content piracy). After the new DRM system is selected (referred to as Type 2 DRM in FIG. 9), the DSP 110 distributes a Type 2 DRM client 122-*b* to every client terminal it wants to service. Alternatively, the Type 2 DRM client 122-*b* may be pre-installed in a client terminal or the Type 2 DRM client 122-*b* may be distributed from a different source.

Notice that the DSP 110 needs to implement both the Type 1 DRM system, including Type 1 DRM clients, and the Type 2 DRM system, as long as not all client terminals have received the Type 2 DRM client 122-b. Additionally, to the extent that the following differ between the two systems, support for both type of content packaging, content encryption, DRM key management and DRM licence management need to be supported while both types of DRM system are still being used.

Typically, a newly installed initial Type 2 DRM client will be provided with a new DCK (as DRM licences are typically DRM system specific, the Type 2 DRM client cannot be in a DRM domain associated with the Type 1 DRM system). For instance, this new DCK or a new associated DCKinit may be pre-loaded in the initial Type 2 DRM client, or a new first key management message including the new associated DCKinit may be issued to the initial Type 2 DRM client. However, observe that stored CDMKinit messages and CDMKs that were generated and distributed for the Type 1 DRM system may be re-used for the Type 2 DRM system. Notice that in the swapping scenario the CDM domain may be larger than a corresponding DRM domain during the transition phase from Type 1 DRM to Type 2 DRM.

If the same content packaging and content encryption schemes are supported by both types of DRM system, then the updated client terminals may render stored content associated with the Type 1 DRM system after the client terminal obtains and installs a new Type 2 DRM client and after the client terminal obtains a new Type 2 DRM licence for that stored content. The new Type 2 DRM licence is issued by the DSP, and contains the relevant CK or CKI being super-encrypted using the new DCK.

After a client terminal has received and installed a Type 2 DRM client 122-b, the Type 1 DRM client (not shown in FIG. 9) may be deleted. A reason for not deleting the Type 1 DRM client could be to allow the client equipment to continue accessing/rendering stored Type 1 DRM content using stored Type 1 DRM licences. Another reason for not deleting the Type 1 DRM client could be that the Type 1 DRM client may be in use by a different DSP.

It will be understood that variations and modifications may be made to the described embodiments without departing from the scope of the invention as defined in the appended claims. For example, it is to be understood that any feature described in relation to any one embodiment may be used alone, or in combination with other features described in respect of that or other embodiments.

The invention claimed is:

1. A method of controlling use of encrypted content by a plurality of client terminals each provided with a digital rights management (DRM) client and a content decryption module separate to the DRM client, the DRM client being associated with a DRM system that generates and distributes a DRM license, the method comprising:
providing first key information for use by one or more selected ones of the DRM clients;
providing second key information for use by one or more selected ones of the content decryption modules;
encrypting content key information to form encrypted content key information such that the selected ones of the content decryption modules are enabled by the second key information to recover the content key information from the encrypted content key information, wherein the content key information comprises a content key for decrypting said encrypted content or information from which the one or more selected content decryption modules are able to recover the content key for decrypting said encrypted content;
encrypting the encrypted content key information to form super-encrypted content key information for use as part of the DRM license such that the selected ones of the DRM clients are enabled by the first key information to recover the encrypted content key information from the super-encrypted content key information.

2. The method of claim 1 further comprising:
directing the encrypted content, and the super-encrypted content key information to at least one of said client terminals which comprises both a selected DRM client and a selected content decryption module, the content being encrypted such that a selected content decryption module of said at least one of said client terminals can decrypt the content using said content key information.

3. The method of claim 1 further comprising generating a first key management message containing said first key information for use by one or more selected ones of the DRM clients, and directing said first key management message to said at least one of said client terminals which comprises both a selected DRM client and a selected content decryption module for use in recovering the encrypted content key information from the super-encrypted content key information.

4. The method of claim 1 further comprising generating a second key management message containing said second key information for use by one or more selected ones of the content decryption modules, and directing said second key management message to said at least one of said client terminals which comprises both a selected DRM client and a selected content decryption module for use in recovering the content key information from the encrypted content key information.

5. The method of claim 1 wherein there is a plurality of said selected DRM clients and said plurality of selected DRM clients are in the same DRM domain.

6. The method of claim 1 wherein at least one of said client terminals comprises one but not both of a selected DRM client and a selected content decryption module.

7. The method of claim 1 wherein the encrypted content key information is not larger than the content key.

8. The method of claim 1 further comprising packaging the super-encrypted content key information in the DRM license and forwarding the DRM license to the at least one client terminal comprising both a selected DRM client and a selected content decryption module, the DRM license providing the at least one client terminal with at least one content usage rule further controlling use of said content at said at least one client terminal comprising both a selected DRM client and a selected content decryption module.

9. The method of claim 1 further comprising causing at least one of said selected client terminals to install a new DRM client.

10. The method of claim 1 wherein the encrypted content key information is not larger than the content key.

11. A method of operating a client terminal comprising:
providing first key information at a DRM client associated with the client terminal, the DRM client being associated with a DRM system that generates and distributes a DRM license;
providing second key information at the client terminal;
receiving super-encrypted content key information, as part of the DRM license, and encrypted content;
passing to the DRM client the super-encrypted content key information and receiving back from the DRM client encrypted content key information derived from the super-encrypted content key information using the first key information;

decrypting the encrypted content key information using the second key information to yield the content key information; and decrypting the encrypted content using the content key information.

12. The method of claim 11 further comprising receiving and passing to the DRM client associated with the client terminal a first key management message comprising said first key information.

13. The method of claim 11 further comprising receiving a second key management message comprising said second key information.

14. The method of claim 11 wherein the steps of decrypting the encrypted content key information, and decrypting the encrypted content are carried out in a content decryption module separate from the DRM client.

15. The method of claim 11 further comprising, at the DRM client, using the first key information to provide a DRM client key, receiving the super-encrypted content key information, using the DRM client key to decrypt the super-encrypted content key information to form encrypted content key information, and returning the encrypted content key information for further decryption and use.

16. The method of claim 11 wherein the DRM client is installed at the client terminal.

17. The method of claim 11 further comprising receiving and installing a new DRM client at the client terminal.

18. Apparatus for controlling use of encrypted content by a plurality of client terminals each provided with a digital rights management (DRM) client and a content decryption module separate to the DRM client, the DRM client being associated with a DRM system that generates and distributes a DRM license, said apparatus comprising:
  a memory for storing data related to the encrypted content; and
  one or more processors configured to:
    provide first key information for use by one or more selected ones of the DRM clients;
    provide second key information for use by one or more selected ones of the content decryption modules;
    encrypt content key information to form encrypted content key information such that the selected ones of the content decryption modules are enabled by the second key information to recover the content key information from the encrypted content key information, wherein the content key information comprises a content key for decrypting said encrypted content or information from which one or more selected content decryption modules are able to recover a content key for decrypting said encrypted content; and
    encrypt the encrypted content key information to form super-encrypted content key information for use as part of the DRM license, such that the selected ones of the DRM clients are enabled by the first key information to recover the encrypted content key information from the super-encrypted content key information.

19. The apparatus of claim 18 further arranged to direct the encrypted content and the super-encrypted content key information to at least one of said client terminals which comprises both a selected DRM client and a selected content decryption module, the content being encrypted such that the at least one content decryption module can decrypt the content using said content key information.

20. The apparatus of claim 18 further arranged to generate a first key management message for enabling one or more selected ones of the DRM clients to recover the encrypted content key information from the super-encrypted content key information, the apparatus being further arranged to forward the first key management message to the at least one of said client terminals which comprises both a selected DRM client and a selected content decryption module.

21. The apparatus of claim 18 further arranged to generate a second key management message for enabling one or more selected ones of the content decryption modules to recover the content key information from the encrypted content key information, the apparatus being further arranged to forward second key management message to the at least one of said client terminals which comprises both a selected DRM client and a selected content decryption module.

22. A client terminal adapted for use with a DRM client associated with the client terminal, the DRM client being associated with a DRM system that generates and distributes a DRM license, the client terminal arranged to receive super-encrypted content key information, as part of the DRM license, and encrypted content, the client terminal comprising:
  a memory for storing date related to the encrypted content;
  one or more processors configured to:
    pass to the DRM client the super-encrypted content key information, and receive from the DRM client encrypted content key information, the encrypted content key information derived by the DRM client from the super-encrypted content key information using a DRM client key;
    decrypt the encrypted content key information using a content decryption module key to yield the content key information; and
    decrypt the encrypted content using the content key information.

23. The client terminal of claim 22 further arranged to receive a first key management message, the client terminal being arranged to pass to the DRM client the first key management message, the first key management message enabling the DRM client to derive the DRM client key.

24. The client terminal of claim 22 further arranged to receive a second key management message, the client terminal further comprising a content decryption module key derive function arranged to derive the content decryption module key from the second key management message.

25. The client terminal of claim 22 further comprising said DRM client.

26. The client terminal of claim 25 wherein the content key information decryption function, and the content decryption function, are located in a content decryption module of the consumer equipment separate from the DRM client.

27. The client terminal of claim 22 wherein the content decryption module is comprised within a client terminal integrated circuit.

28. A system comprising:
  an apparatus in combination with a plurality of client terminals, each client terminal provided with a digital rights management (DRM) client and a content decryption module separate to the DRM client, the DRM client being associated with a DRM system that generates and distributes a DRM license, wherein:
    the apparatus comprises: a memory for storing data related to encrypted content; and one or more processors configured to:

provide first key information for use by one or more selected ones of the DRM clients;

provided second key information for use by one or more selected ones of the content decryption modules;

form first encrypted content key information by encrypting content key information, such that the selected ones of the content decryption modules are enabled by the second key information to recover the content key information from the first encrypted content key information, wherein the content key information comprises a content key for decrypting said encrypted content or information from which one or more selected content decryption modules are able to recover the content key for decrypting said encrypted content; and encrypt the first encrypted content key information to form super-encryption content key information for use as part of the DRM license, such that the selected ones of the DRM clients are enabled by the first key information to recover the first encrypted content key information from the super-encrypted content key information; and wherein each client terminal is arranged to receive the super-encrypted content key information, as part of the DRM license, and encrypted content, the client terminal being arranged to pass to the DRM client the super-encrypted content key information, and to receive from the DRM client second encrypted content key information derived from the super-encrypted content key information using a DRM client key, the client terminal having a content key information decryption function arranged to decrypt the second encrypted content key information using a content decryption module key to yield the content key information, and a content decryption function arranged to decrypt the encrypted content using the content key information.

29. One or more tangible computer readable media comprising computer program code arranged to put into effect, when executed by a processor, a method of controlling use of encrypted content by a plurality of client terminals each provided with a digital rights management (DRM) client and a content decryption module separate to the DRM client, the DRM client being associated with a DRM system that generates and distributes a DRM license, the method comprising:

providing first key information for use by one or more selected ones of the DRM clients;

providing second key information for use by one or more selected ones of the content decryption modules;

encrypting content key information to form encrypted content key information such that the selected ones of the content decryption modules are enabled by the second key information to recover the content key information from the encrypted content key information, wherein the content key information comprises a key for decrypting said encrypted content or information from which the one or more selected content decryption modules are able to recover a content key for decrypting said encrypted content;

encrypting the encrypted content key information to form super-encrypted content key information for use as part of the DRM license, such that the selected ones of the DRM clients are enabled by the first key information to recover the encrypted content key information from the super-encrypted content key information.

30. One or more tangible computer readable media comprising computer program code arranged to put into effect, when executed by a processor, a method of operating a client terminal, the method comprising:

providing first key information at a DRM client associated with the client terminal, the DRM client being associated with a DRM system that generates and distributes a DRM license;

providing second key information at the client terminal;

receiving super-encrypted content key information, as part of the DRM license, and encrypted content;

passing to the DRM client the super-encrypted content key information and receiving back from the DRM client encrypted content key information derived from the super-encrypted content key information using the first key information;

decrypting the encrypted content key information using the second key information to yield the content key information; and decrypting the encrypted content using the content key information.

* * * * *